United States Patent [19]
Bench

[11] Patent Number: 5,743,925
[45] Date of Patent: Apr. 28, 1998

[54] COMPACT CYCLONE FILTER TRAIN FOR RADIOLOGICAL AND HAZARDOUS ENVIRONMENTS

[75] Inventor: Thomas R. Bench, Pittsburgh, Pa.

[73] Assignee: The United States of America as represented by the Department of Energy, Washington, D.C.

[21] Appl. No.: 635,421

[22] Filed: Apr. 10, 1996

[51] Int. Cl.⁶ .................................................. B01D 45/12
[52] U.S. Cl. ........................... 55/274; 55/336; 55/481; 55/482; 55/337; 55/429; 55/DIG. 9; 55/DIG. 34
[58] Field of Search ........................... 55/318, 319, 320, 55/322, 323, 337, DIG. 9, 278, 429, 336, 481, 482, DIG. 34, 274

[56] References Cited

U.S. PATENT DOCUMENTS

| | | | |
|---|---|---|---|
| 3,618,302 | 11/1971 | Cornett | 55/337 |
| 4,062,664 | 12/1977 | Dupre et al. | 55/319 |
| 4,521,234 | 6/1985 | Peebles, Jr. et al. | 55/DIG. 9 |
| 4,695,299 | 9/1987 | Spadaro et al. | 55/337 |
| 4,773,922 | 9/1988 | Ross et al. | 55/DIG. 9 |
| 4,820,315 | 4/1989 | DeMarco | 55/337 |
| 4,957,520 | 9/1990 | Parmentier et al. | 55/337 |
| 5,244,579 | 9/1993 | Horner et al. | 210/652 |

*Primary Examiner*—Jay H. Woo
*Assistant Examiner*—Robert Hopkins
*Attorney, Agent, or Firm*—Virginia B. Caress; William R. Moser; Paul A. Gottlieb

[57] ABSTRACT

A compact cyclone filter train for the removal of hazardous and radiological particles from a gaseous fluid medium which permits a small cyclone separator to be used in a very small space envelope due to the arrangement of the filter housing adjacent to the separator with the cyclone separator and the filters mounted on a plate. The entire unit will have a hoist connection at the center of gravity so that the entire unit including the separator, the filters, and the base can be lifted and repositioned as desired.

19 Claims, 2 Drawing Sheets ically on the vertical component 8 of the plenum 4. This provides for an air/gas flow pattern which requires a minimum amount of space and permits the centrifuge train C to be readily used in sealed off compact areas.

COMPACT CYCLONE FILTER TRAIN FOR RADIOLOGICAL AND HAZARDOUS ENVIRONMENTS

This invention relates to cyclone filter trains and more particularly to a compact filter train which can be easily moved from one place to another and positioned in areas that are cramped for space. This invention was developed pursuant to a United States Department of Energy contract.

HISTORICAL BACKGROUND

Although there are known cyclone separators using filter trains, there is presently no available equipment which can be utilized in confined areas without producing more waste in the process. Such equipment that is available, requires substantial modification thereto by way of long and complicated ducting trains leading from the area being treated. In general, the present available equipment is not compact enough to be readily positioned in sealed off areas of minimal space.

OBJECTS AND SUMMARY

It is an object of this invention to provide a movable filter train which includes cartridge filters and a cyclone in a single unit which can be readily transported from one place to another by a transport mechanism.

It is still a further object of this invention to provide a filter train which includes the cyclone separator and the filters mounted on a movable platform.

Yet a further object of this invention is to provide a compact filter system in which the cyclone and filters are mounted on a platform which has a lifting mechanism at the center of gravity to avoid tilting of the train during moving operations thereby avoiding unnecessary damage to the train during moving operations.

It is still a further object of this invention to provide a cyclone filter train which can be readily shipped in a compacted cube-like container.

Another object of this invention is to provide a filter train which permits ready access to the cartridge filters without the necessity of having to disconnect ducting and the like from the cyclone.

A further object of this invention is to provide a filter system which will permit processing of the filters without exposing operators to unnecessary radiation fields when the filter is replaced.

Still another object of this invention is to provide a cyclone filter train which will permit the air flow from the cyclone to be directed downwardly and subsequently through the filters to reduce the area of the space envelope of the train.

Yet a further object of this invention is to provide a filter train which is easy and inexpensive to manufacture.

In summary, the present invention discloses a novel arrangement for a cyclone filter train which is readily movable and compact. These and other objects of the invention will be apparent from the following:

DETAILED DESCRIPTION OF THE INVENTION

Figure 1:
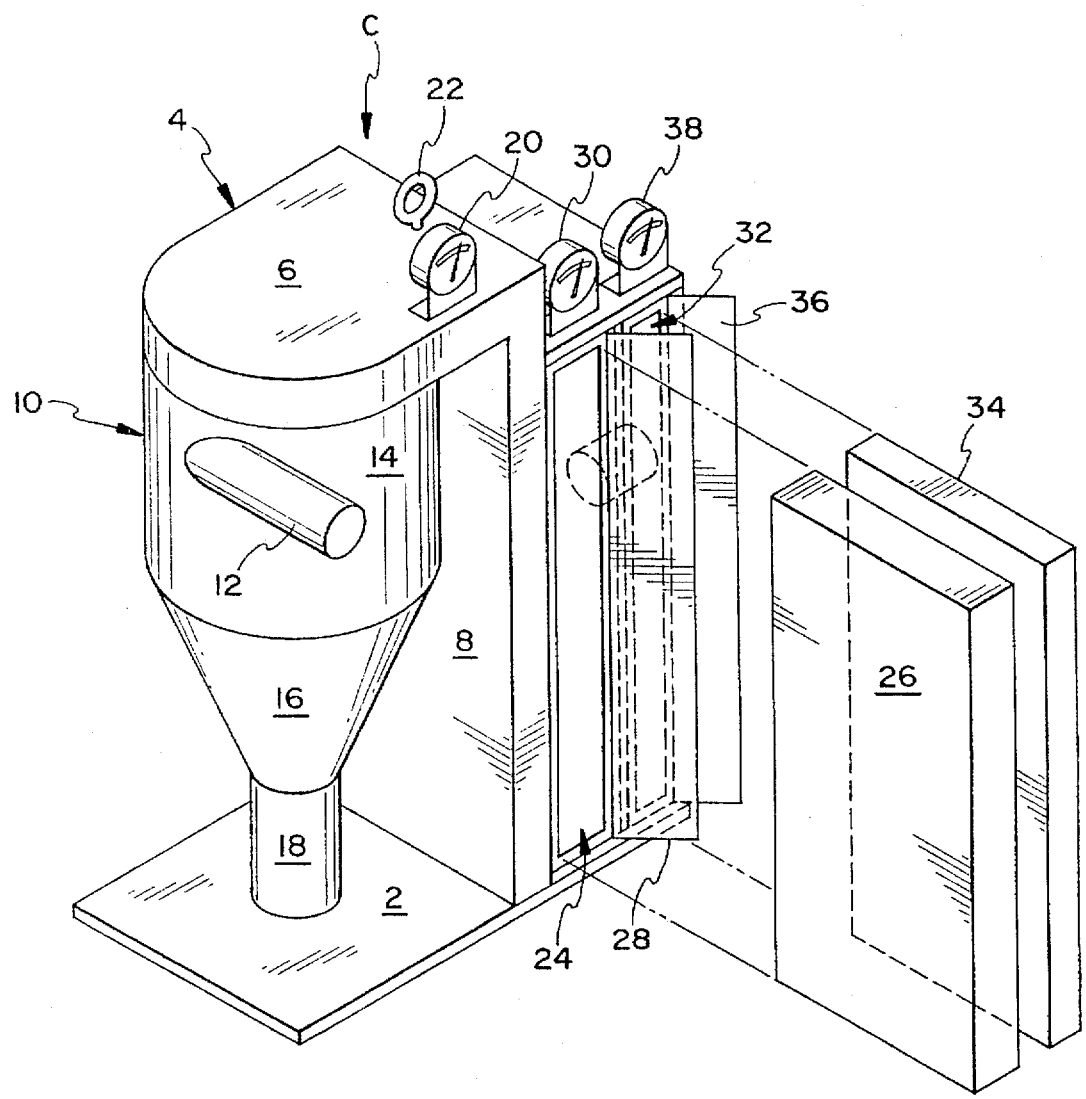
FIG. 1 is a perspective view of the invention.

In FIG. 1, the centrifuge train C comprises a base support 2 of metal, plastic or the like. Mounted on the base 2 is a plenum 4 which is 7-shaped which includes a horizontal component 6 and a vertical component 8. The vertical component 8 is attached to the base support 2. A cyclone separator 10 is mounted to the horizontal plenum component 6 and comprises an air/gas inlet opening 12 into the cylinder 14 of the cyclone separator 10. The cone 16 of the cyclone separator 10 supports a removable container 18. The removable container 18 may be removably attached by any conventional means (not shown) such as clamps, threading, lugs or the like. Mounted on the horizontal component 6 is a differential pressure gauge 20. Also mounted on the horizontal component 6 is a lifting eye 22 which is suitably positioned at the center of gravity of the centrifuge train C to avoid tilting of the centrifuge train C during transport of the centrifuge train C from one position to another. Although a lifting eye 22 is disclosed in the drawings, other lifting mechanisms can be utilized and positioned at the center of gravity of the centrifical train C. Secured to the rear of the vertical component 8 of the plenum 4 is a roughing filter cartridge and housing 24 which includes a removable filter 26. The removable filter 26 is accessible for changing through an access door 28. Conventional means (not shown) is provided for opening the door 28 either remotely or by manual means as desired. Similarly, grappling means (not shown) can be provided for disengaging the removable filter 26 from the roughing filter cartridge and housing 24.

Above the roughing filter and housing 24 is a differential pressure gauge 30. The roughing filter cartridge and housing 24 are attached to the vertical component 8 of the plenum 4 by means (not shown) such as welding, clamping, and the like. The plenum 4 has an opening in the horizontal component at the bottom thereof leading into the cylinder 14 of the cyclone separator 10. The cyclone separator 10 is connected to the plenum 4 at the bottom thereof by welding, threading, or the like (not shown). The vertical component 8 of the plenum 4 is provided with opening means (not shown) which permits air/gas to flow from the plenum 4 into the roughing filter cartridge and housing 24 and through the removable filter 26. The roughing filter cartridge and housing 24, may be supported solely by the vertical component 8 of the plenum 4, or it may be supported directly on the base 2 and secured thereto by means (not shown) such as screws, clamps, welding, and the like. Adjacent to the roughing filter cartridge and housing is a second filter cartridge and housing 32. The second filter cartridge and housing 32 is of a high efficiency particle air/gas (HEPA) filter 34. An access door 36 is provided in the second filter cartridge and housing 32 permitting removal of the HEPA filter 34. Above the second filter cartridge and housing 32 is a differential pressure gauge 38.

The second filter cartridge and housing 32 is secured to the roughing filter cartridge and housing 24 by means (not shown) such as welding, clamps, or the like. The second cartridge filter and housing 32 is provided with opening means (not shown) to the roughing filter cartridge and housing 24 in series therewith to permit the air/gas exiting from the centrifuge 10 and through the plenum 4 to pass from the roughing filter cartridge and housing 24 through the filter 34.

Figure 2:
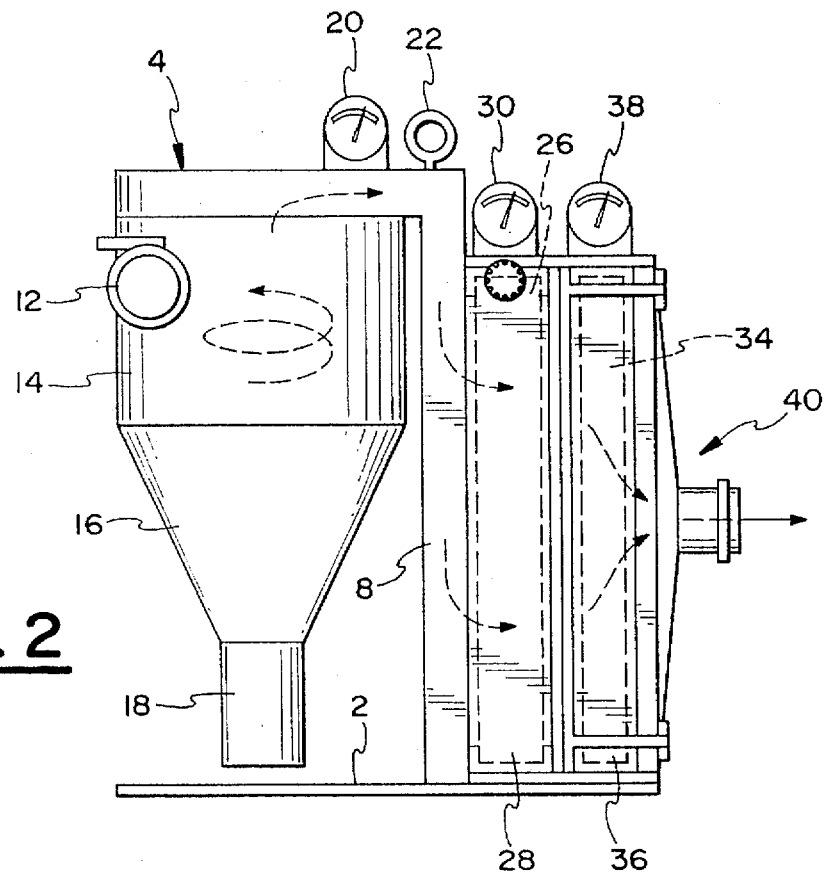
FIG. 2 is a side elevational view of the invention.
Figure 3:
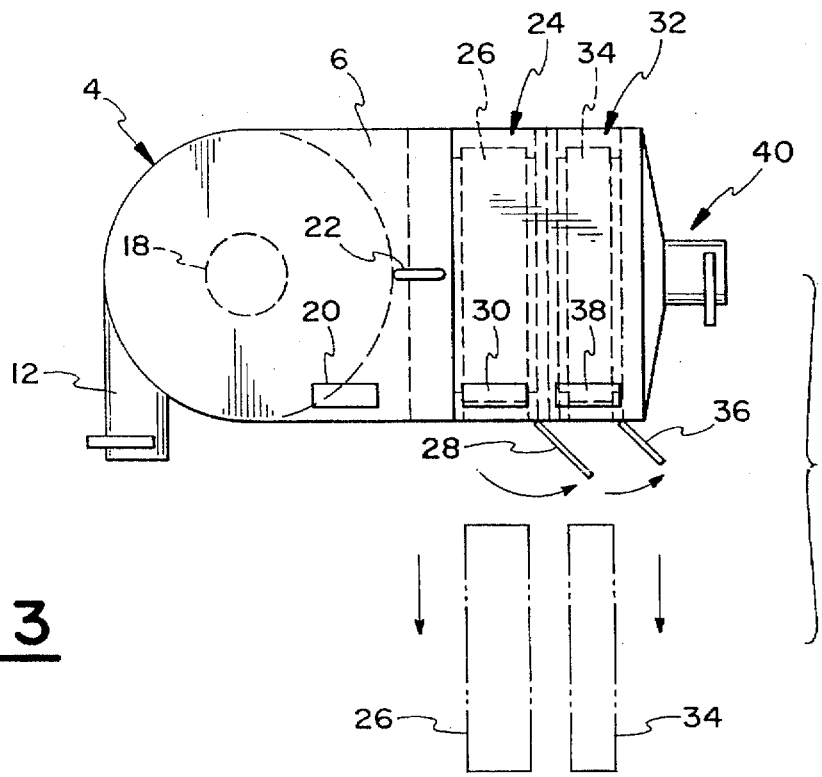
FIG. 3 is a top plan view of the invention.

As best shown in FIGS. 2 and 3, an air/gas outlet 40 is secured to the second filter cartridge and housing 32 for exhausting the air/gas passing through the HEPA filter 34. Means for conducting the exiting air/gas from the system to the atmosphere or the like is not shown.

It should be noted that the roughing filter cartridge and housing 24 and the second filtered cartridge and housing 32 are positioned vertically adjacent the vertical component 8 of the plenum 4. Both the roughing filter cartridge and housing 24 and the second cartridge and housing 32 may be secured to the base 2 and supported thereby or may be suspended from the vertical component 8 of the plenum 4 by conventional means of fastening or welding or the like.

All of the connecting components in the centrifical train C are provided with sealing means (not shown) which prevent escape of the air/gas through the centrifuge train C when the cyclone 10 is in operation.

OPERATION

In operation, the filter train C is designed to be used primarily to decontaminate radiological and hazardous materials in confined areas where compact equipment is needed and where this equipment is remotely controlled through robotic arms or the like. It has application to various contaminated gases.

Under normal use in a area where air is to be cleansed from impurities, the air is directed through the inlet 12 into the cyclone separator 10. Heavier particles are drawn down into the waste container 18. The waste container 18 may be remotely replaceable as before indicated by means (not shown).

After passing through the cyclone separator 10, the air is conducted to the horizontal component 6 of the plenum 4 and down the vertical component 8 and through the removable filters 26 and 34. In the system designed, normal air flow rate is approximately 250 CFM (cubic feet per minute). The heavier particles removed in the container 18 are down to approximately 7 microns in size. In the roughing filter 26, the particles removed are down to about 4 microns in size, and in the HEPA filter 34, the particles are down to approximately 0.3 microns in size. The efficiency of the unit runs at 99.97%.

The centrifuge train C is designed to be very compact so as to be able to pass through doors without interference with the door frames and also to be positioned in minimal cubic space. The close positioning of the two filters vertically with regard to the plenum and the cyclone is very important to the basic mobility of the unit including the mounting on the platform 2 which dimensionally is kept to a minimum based on the width of the filter cartridge and housing 24 and 32 and the cyclone separator 10.

The pressure differential gauges 20, 30, and 38 allow the operator of the centrifuge train C to determine the efficiency of the air flow through the centrifuge train C so as to be able to determine when it is necessary to clean out the plenum 4 or replace the filters 26 and 34.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A compact, single unit, readily moveable, cyclone filter train, adapted for decontaminating radiological material in confined areas, and capable of being remotely controlled, comprising:

a) a base,
   b) a cyclone filter supported vertically on said base having a bottom, a top and cylindrical and conical side walls,
   c) an air/gas inlet in one of said side walls,
   d) means in said bottom for securing a removable heavier particle waste receiving container,
   e) a waste receiving container sealably secured to said cyclone filter bottom, and adapted to be remotely replaceable,
   f) a gas plenum having horizontal and vertical components mounted on said top,
   g) said horizontal component extending laterally a short distance from said top,
   h) said vertical component extending vertically downwardly adjacent said cylindrical wall of said cyclone filter and connected to said base,
   i) said gas plenum supporting said cyclone filter vertically above said base,
   j) at least one filter housing mounted vertically on said vertical component of said gas plenum, sealably connected to the rear of said vertical plenum component and including means for removing and sealably receiving removable cartridge filter means,
   k) a first removable cartridge filter means in said at least one filter housing,
   l) gas outlet means for receiving gas from said at least one filter housing, and
   m) means associated with said filter train for measuring said filter means effectiveness.

2. A compact cyclone filter train as in claim 1 and wherein:
   a) said plenum is "7" shaped.

3. A compact cyclone filter train as in claim 1 and wherein:
   a) said plenum includes a lifting means.

4. A compact cyclone filter train as in claim 3 and wherein:
   a) said lifting means is a hook eye.

5. A compact cyclone filter train as in claim 3 and wherein:
   a) said lifting means is positioned on said horizontal component.

6. A compact cyclone filter train as in claim 5 and wherein:
   a) said lifting means is located at the center of gravity of said compact cyclone filter train on said horizontal component.

7. A compact cyclone filter train as in claim 1 and wherein:
   a) said at least one filter housing is connected to said base.

8. A compact cyclone filter train as in claim 1 and wherein:
   a) said measuring means is a differential pressure gauge.

9. A compact cyclone filter train as in claim 1 and including:
   a) a second filter housing mounted vertically on said at least one filter housing and sealably connected to said at least one filter housing and including means for removing and sealably receiving cartridge filter means.

10. A compact cyclone filter train as in claim 9 and wherein:
    a) said second housing is connected to said base.

11. A compact cyclone filter train as in claim 10 and wherein:
    a) said gas outlet means is connected to said second housing.

12. A compact filter train as in claim 11 wherein said first removable cartridge filter means in said at least one filter housing is removable by remote control.

13. A compact filter train as in claim 12 and including:
   a) a second removable cartridge filter means in said second filter housing, said second filter means is removable by remote control.

14. A compact cyclone filter train as in claim 13 and wherein:
   a) said first removable cartridge filter means includes a roughing filter; and
   b) said second removable cartridge filter means is a very high efficiency fine particle filter.

15. A compact cyclone filter train as in claim 14 and wherein:
   a) said filter train has a height and length approximately the same for positioning said filter train in minimal cubic space.

16. A compact cyclone filter train as in claim 14 and wherein:
   a) said roughing filter removes heavier particles down to 4 microns and said very high efficiency filter removes up to 99.97% of the remaining particles down to 0.3 microns in size.

17. A compact cyclone filter train as in claim 1 and wherein:
   a) said measuring means includes a plurality of differential pressure gauges.

18. A compact cyclone filter train as in claim 17 and wherein:
   a) said plurality of differential pressure gauges include a differential pressure gauge on said plenum, and on at least said one filter housing.

19. A compact cyclone filter train as in claim 9 and wherein:
   a) said measuring means includes a differential pressure gauge on said plenum, on said at least one filter housing and on said second filter housing.

* * * * *